United States Patent [19]

Kraus

[11] Patent Number: 4,759,704

[45] Date of Patent: Jul. 26, 1988

[54] STRING CHEESE CUTTER

[75] Inventor: Gerald L. Kraus, Plymouth, Wis.

[73] Assignee: Sargento Incorporated, Plymouth, Wis.

[21] Appl. No.: 939,198

[22] Filed: Dec. 8, 1986

[51] Int. Cl.$^{4}$ .............................................. B29C 47/92

[52] U.S. Cl. .................................... 425/140; 425/142; 425/311; 426/516; 426/518; 83/372; 83/639

[58] Field of Search ............... 425/308, 310, 311, 140, 425/142, 135, 147, 161; 83/372, 639; 426/231, 518, 516; 264/142, 143, 40.4, 148; 222/55

[56] References Cited

U.S. PATENT DOCUMENTS

| | | | |
|---|---|---|---|
| 1,564,369 | 12/1925 | Snyder | 425/308 |
| 2,544,467 | 3/1951 | Michel | 425/135 |
| 2,712,693 | 7/1955 | Comparette | 425/308 |
| 3,400,426 | 9/1968 | Boggs | 425/142 |
| 3,530,491 | 9/1970 | Rejsa | 425/142 |
| 4,392,801 | 7/1983 | Meyer | 425/308 |
| 4,580,490 | 4/1986 | Jorgensen | 425/310 |
| 4,648,822 | 3/1987 | Vandervoort et al. | 425/142 |

*Primary Examiner*—Charles Hart

*Attorney, Agent, or Firm*—Wheeler Law Firm

[57] ABSTRACT

A device for cutting string cheese at a precise length as the string cheese is extruded. The device is comprised of a trip lever, a pivoting counterweight attached to the trip lever, a support bracket having an upper and lower stop to limit the movement of the pivoting counterweight, a plastic rod connected to the pressure release valve, the pressure release valve which operates the valve actuator when the pressure release valve is displaced from its rest position by the counterweight deflecting the plastic rod as the counterweight pivots, a valve actuator connected to an air supply, a valve connected to the valve actuator by tubing, a pneumatic cylinder connected to a valve by tubing and having a piston, and a knife attached to the piston of the pneumatic cylinder. When the desired length of cheese is reached, the weight of cheese on the trip lever activates the device causing the knife to intersect the path of the cheese and cut it. The support bracket rests on a pinion so that it may be vertically adjusted to allow any desired length of cheese to be cut.

14 Claims, 1 Drawing Sheet

STRING CHEESE CUTTER

BACKGROUND OF THE INVENTION

The present invention relates to a device for cutting string cheese to a specific length as it is formed. String cheese is extruded very much like plastic, being put under pressure and forced through an opening of an appropriate size and shape so that it comes out in a string. In the past, the problem has been to make the string an appropriate length. If the string cheese is travelling horizontally at the time it is cut, frequently it is drawn to a thinner cross section over part of its length so that the weight of the piece is not uniform. If it is moving vertically, it is possible to use a limit switch having a projecting stainless steel wire to actuate the cutter, but the stainless steel wire is fragile and the weight of the cheese is often great enough to bend the wire so that the length of the piece becomes something other than was intended. In addition, because the string cheese drops into a salt water cooling bath once it is cut, brine is splashed on the cheese cutting mechanism thereby harming any of the exposed electronic circuits.

The prior art closest to the present invention is U.S. Pat. No. 1,564,637 to Snyder; U.S. Pat. No. 2,712,693 to Comparette; and U.S. Pat. No. 4,392,801 to Meyer. Snyder discloses an apparatus for forming cream centers in candy. A number of different centers for candy are extruded, but they are all cut simultaneously by a wire frame which is moved under the extruding nozzle by a hand lever. Thus, they are all cut simultaneously whether or not they are the same size. The Comparette patent is concerned with extruding balls of cheese, and the mechanism for severing the ball from the extruder nozzle is completely different from the mechanism in the present invention. There is nothing in Comparette that shows any means for measuring the length or size of the cheese to determine when it should be cut off. Finally, the Meyer patent shows a process in which the cheese is pulled under tension and the cutoff device is actuated by a limit switch which runs a solenoid to operate a knife. The cheese is travelling horizontally when it strikes the limit switch and is crossing a trough-shaped tilt table. Neither the mechanism nor the condition of operation are much like that of the present invention.

SUMMARY OF THE INVENTION

The present invention has replaced the earlier hydraulic cutter with a pneumatic cutter and has replaced the limit switch with a specially designed valve actuator. The commercial valve actuator is provided with a bleeder port on one side of the diaphragm which is constantly under air pressure such that when the air pressure is released, the valve is actuated sending air to a pneumatic cylinder which carries a cheese cutoff knife. The stainless steel whisker normally used to actuate the bleeder port has been replaced with a piece of plastic tube, preferably made of delrin, which is very much larger in diameter than the stainless steel wire. Adjacent to the plastic tube or rod is a very heavy stainless steel wire trip lever supported on a pivot that is quite close to the plastic rod or tube and which carries a large counterweight that can be adjusted so that the actuating pressure is precisely three grams (or whatever is best for the particular cheese). Upper and lower stops are provided to limit the movements of the counter weight and the trip lever. Because the actuating pressure is so precise and the trip lever so durable, the cheese is cut with great uniformity to a precise adjustable length. In practice, there would be such a trip lever for every extrusion opening and all the trip levers and associated bleeder ports would be carried on a base which serves as a lower stop for trip lever movement and which also is adjustable in distance from the extrusion opening so that cheese can be cut at various lengths. If, for instance, the extrusion openings were in a ring, the base would also be a ring so that the respective trip levers extending to the paths of the respective cheese strings. As each string achieves the correct length the trip lever would activate the bleeder port for dumping air from the valve actuator causing the valve to be actuated in a pneumatic cylinder to push the cutoff knife forward. The piece of string cheese would then fall into the brine.

An additional advantage of this structure is that it is entirely pneumatic and mechanical and therefore is not subject to damage by brine in the same way that electronic circuits are. A further advantage is that the bleeder port is constantly under pressure as are all of the other parts of the pneumatic system so that whenever the bleeder port is tripped, it emits a puff of air to clean the opening. Brine is never admitted to damage the parts. Furthermore, the trip lever that contacts the cheese is stainless steel and is of a very simple shape so that it is readily cleaned.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
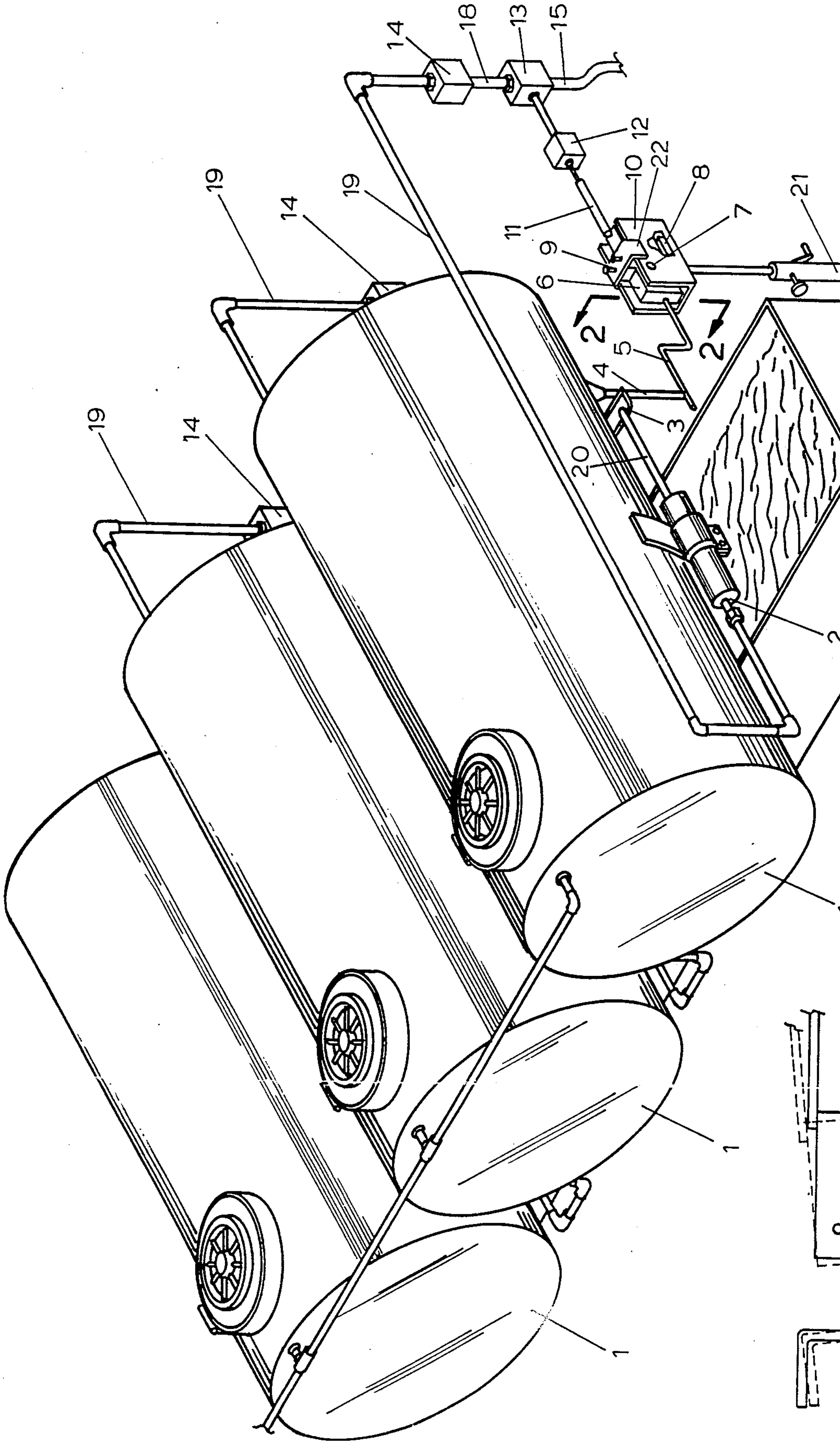
FIG. 1 is a right front perspective view of the invention.
Figure 2:
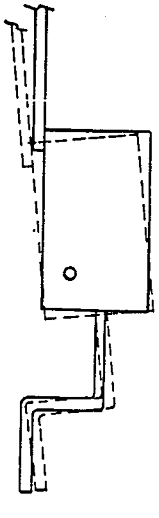
FIG. 2 is a blown-up view of a region of FIG. 1.

As shown in FIG. 1, when a string of cheese forms under pressure in vats 1 is extruded it comes into contact with the trip lever 5. The trip lever 5 is attached to a counter weight 6 which pivots about pivot 7. As best shown in FIG. 2, the movement of the counterweight 6 is limited by the lower stop 8 at the bottom of the support bracket 10 and the upper stop 9 which is removably attached by known fastening means 22 to the support bracket. When the strand of cheese 4 reaches the length desired, the weight of the cheese 4 will exert enough force on the trip lever 5 so that the counterweight 6 will pivot until it displaces the plastic tube rod 11 and the attached pressure release valve 12 from their rest positions. The actuating pressure of cheese 4 on trip lever 5 required to cause the pressure release valve 12 to be displaced is relatively precise, and the length of the segment of cheese 4 to be cut can be adjusted by moving the support bracket 10 up and down. For instance, it may be mounted on telescopically adjustable post 21, or on a known vertical adjustment means. When the support bracket 10 is raised, the cheese 4 will come into contact with trip lever 5 earlier and the length of cheese 4 cut will be short when the support lever 10 is lowered the length of cheese 4 cut will be longer. The displacement of the pressure release valve 12 operates the valve actuator 13. The valve actuator 13 is hooked up to an air supply 15 so that the diaphragm in the valve actuator 13 is constantly under air pressure until the air pressure is released by the displacement of the pressure release valve 12. Valve actuator 13 is connected to valve 14 by conduit 18. When the air pressure is released, the valve 14 is actuated sending air through tubing 19 to the pneumatic cylinder 2 which has a piston 20. The increase in air pressure against the piston 20 and the knife 3 attached to the piston 20 causes them to move into the path of the cheese strand 4 cutting the strand 4 to the desired length. The cut cheese 4 then falls into the brine bath 16, as is known.

What is claimed is:

1. An apparatus for cutting an extruded strand of cheese to length comprising a cheese extruder oriented to extrude a strand of cheese in a downward direction, and a cutter positioned to cut the strand of cheese upon receipt of an actuation signal, the novelty comprising means for sending an actuation signal to said cutter including a stiff pivoted trip lever positioned in the path of the extruded strand of cheese, said means for sending said actuation signal being adapted to send said signal upon contact of a weighted amount of said extruded strand of cheese with said trip lever.

2. The apparatus of claim 1 in which the strand of cheese is vertically extruded.

3. The device of claim 1 in which at least said means for sending said actuation signal is pneumatically operated.

4. The device of claim 1 further including a pivoting counterweight attached to said trip lever at the end of said trip lever at the end most remote from the path of said extruded strand of cheese.

5. The device of claim 4 further including a support bracket for said trip lever and said counterweight to which said counterweight is pivoted, said support bracket having an upper and lower stop which limit the movements of said pivoting counterweight.

6. The device of claim 5 including a pressure release valve having a rest position, the pressure release valve being provided with a rod which extends into the path of the pivoting counterweight, said rod being vertically displaced by said pivoting counterweight when cheese displaces the trip lever, said pressure release valve rod being vertically displaced from its rest position by said trip lever counterweight when said trip lever is contacted by said extruded strand of cheese sufficiently to displace said counterweight.

7. The device of claim 6 in which said rod is a rod of stiff plastic.

8. The device of claim 6 in which said rod is a tube of stiff plastic.

9. The device of claim 6 in which said trip lever has a length at least three times the length from the pivot of the trip lever to the center of gravity of the counterweight.

10. The device of claim 6 including a valve actuator, a valve, and an air supply, said valve actuator being operated when said pressure release valve is vertically displaced from its rest position.

11. The device of claim 10 including a pneumatic cylinder connected by tubing to said valve and having a piston which is attached to said cheese cutting means, said pneumatic cylinder being operated when said valve actuator is operated, said piston being displaced when said pneumatic cylinder is operating thereby causing said cutting means to intersect the path of an extruded strand of cheese, cutting the strand of cheese.

12. The device of claim 11 in which the cutting means is a knife.

13. The device of claim 1 in which the trip lever is made of a heavy stainless steel.

14. The device of claim 5 in which the support bracket rests on a pinion which allows the support bracket to be vertically adjusted.

* * * * *